United States Patent [19]

Thoma et al.

[11] Patent Number: 4,543,144
[45] Date of Patent: Sep. 24, 1985

[54] AQUEOUS POLYURETHANE COMPOSITIONS CONTAINING CROSSLINKING AGENTS AND THEIR USE FOR HEAT-ACTIVE ONE-COAT REVERSE COATING

[75] Inventors: Wilhelm Thoma, Leverkusen; Klaus Nachtkamp, Cologne; Walter Schröer; Rolf Langel, both of Leverkusen, all of Fed. Rep. of Germany

[73] Assignee: Bayer Aktiengesellschaft, Leverkusen, Fed. Rep. of Germany

[21] Appl. No.: 599,028

[22] Filed: Apr. 11, 1984

[30] Foreign Application Priority Data

Apr. 13, 1983 [DE] Fed. Rep. of Germany ....... 3313237

[51] Int. Cl.[4] .............................................. B44C 1/00
[52] U.S. Cl. .................................... 156/230; 156/231; 156/238; 156/307.5; 156/331.4; 428/904; 524/501; 524/542; 524/839; 525/456
[58] Field of Search ............ 156/230, 238, 231, 307.5, 156/331.4; 525/456; 524/501, 839, 542; 428/904

[56] References Cited

U.S. PATENT DOCUMENTS

| | | | |
|---|---|---|---|
| 2,830,037 | 4/1958 | Carter | 260/77.5 |
| 3,388,087 | 6/1968 | Dieterich et al. | 260/29.2 |
| 3,461,103 | 8/1969 | Keberle et al. | 260/75 |
| 3,479,310 | 11/1969 | Dieterich et al. | 260/29.2 |
| 3,480,592 | 11/1969 | Dieterich et al. | 260/77.5 |
| 3,597,495 | 8/1971 | Sekmakas et al. | 525/456 |
| 3,645,775 | 2/1972 | Schulte et al. | 428/904 |
| 3,686,108 | 8/1972 | Reiff et al. | 260/29.2 |
| 3,756,992 | 9/1973 | Dieterich | 260/77.5 |
| 4,108,814 | 8/1978 | Reiff et al. | 260/29.2 |
| 4,192,937 | 3/1980 | Noll et al. | 524/839 |
| 4,269,748 | 5/1981 | Nachtkamp et al. | 260/29.2 |
| 4,308,184 | 12/1981 | Thoma et al. | 428/904 |

FOREIGN PATENT DOCUMENTS

1129128 8/1982 Canada .

Primary Examiner—John J. Gallagher
Attorney, Agent, or Firm—Gene Harsh; Joseph C. Gil; Thomas W. Roy

[57] ABSTRACT

This invention relates to compositions of aqueous polyurethane dispersions containing polyurethanes having lateral OH-groups, optionally in admixture with PU-dispersions without any lateral OH-groups, which contain a combination of formaldehyde resins and blocked polyisocyanates as crosslinking agent and, optionally handle-improving agents, silicones and standard additives.

The present invention also relates to the use of these compositions for the production of light coatings by the heat-activated, one-coat reverse coating process, in which the PU-composition is applied to a temporary support and dried, after which the (textile) substrate is laminated onto the dry polyurethane film at elevated temperature and pressure and the polyurethane laminate formed is subsequently crosslinked at a relatively high temperature.

Mixed crosslinking with formaldehyde resins plus blocked polyisocyanates makes it possible to obtain coatings characterized by outstanding substrate adhesion and wet strength values.

16 Claims, No Drawings

AQUEOUS POLYURETHANE COMPOSITIONS CONTAINING CROSSLINKING AGENTS AND THEIR USE FOR HEAT-ACTIVE ONE-COAT REVERSE COATING

BACKGROUND OF THE INVENTION

1. Field of the Invention

This invention relates to compositions of aqueous polyurethane dispersions containing polyurethanes having lateral OH-groups, optionally in admixture mixture with PUR-dispersions without any lateral OH-groups, which contain a combination of formaldehyde resins and blocked polyisocyanates as crosslinking agent and, optionally handle-improving agents, silicones and standard additives.

The present invention also relates to the use of these compositions for the production of light coatings by the heat-activated, one-coat reverse coating process, in which the PUR-composition is applied to a temporary support and dried, after which the (textile) substrate is laminated onto the dry polyurethane film at elevated temperature and pressure and the polyurethane laminate formed is subsequently crosslinked at a relatively high temperature.

Mixed crosslinking with formaldehyde resins plus blocked polyisocyanates makes it possible to obtain coatings characterized by outstanding substrate adhesion and wet strength values.

2. Description of the Prior Art

The production of artificial leather for various applications, such as outer clothing, shoe upper material or suitcase material, from polyurethane starting materials by the transfer process is already known. In general, the artificial leather is made up of two layers (or "coats"), namely the surface layer and the adhesive layer. In general, from 20 to 50 g/m$^2$ of solids are applied per layer. The starting materials used are normally solutions and dispersions of one-component and also two-component polyurethanes. The two-component polyurethanes only receive their final plastic-like character through crosslinking with polyisocyanates.

A more recent technique for coating textile substrates, preferably in web form, is the so-called heat-activated, one-coat reverse coating process. In this process, the coating paste is knife-coated onto a temporary support, for example a release paper or a silicone matrix, the solvent (mixture) is evaporated off, the textile substrate is laminated onto the dry, heat-activated polyurethane film on a heated pressure roll and the polyurethane film subsequently crosslinked at elevated temperature. The advantages of heat-activated, one-coat reverse coating lie in the low spread possible, for example from 15 to 30 g/m$^2$, which enables light coatings to be obtained, but especially in the possibility of using substrates which are unsuitable or less suitable for solvent coating or for direct coating either on account of their construction or on account of their dissolving properties (for example polyacrylate substrates or so-called coagulates). In particular, light or open-mesh woven and knitted fabrics may also be coated by this heat activated, one-coat reverse coating process without any danger of lamination failures.

Disadvantages of heat-activated, one-coat reverse coating process center above all around the adhesion problems experienced with articles produced by that process. The adhesion values vary and the wet adhesion values in particular are relatively poor. In addition, the use of solutions in organic solvents involves ecological problems.

The present invention describes suitable polyurethane compositions and their use for heat-activated, one-coat reverse coating without any of the disadvantages mentioned above.

SUMMARY OF THE INVENTION

The present invention relates to approximately 20 to 60% and preferably 30 to 50% aqueous, crosslinker-containing compositions based on polyurethane dispersions for the production of coatings, characterized in that they contain (I) 100 parts of solids of a mixture of aqueous polyurethane dispersions of
  (A) from about 43 to 100% by weight, preferably from about 70 to 100% by weight and, more preferably, from about 80 to 100% by weight of dispersions of polyurethanes containing lateral OH-groups and
  (B) from 0 to about 57% by weight, preferably from 0 to about 30% by weight and, more preferably, from 0 to about 20% by weight of dispersions of polyurethanes without any lateral OH-groups, (II) from about 3 to 50 parts (solids, based on solids I), preferably from about 4 to 40 parts and, more preferably, from about 5 to 30 parts of a crosslinker combination of
  (C) from about 2.5 to 90% by weight, preferably from about 3 to 60% by weight and, more preferably, from about 4 to 40% by weight of formaldehyde resins, preferably formaldehydeurea and/or formaldehyde-melamine resins and
  (D) from about 10 to 97.5% by weight, preferably from about 40 to 97% by weight and, more preferably, from about 60 to 96% by weight of blocked polyisocyanates, (III) from 0 to about 15 parts (based on I)), preferably from 0 to about 10 parts and, more preferably, from about 1 to 6 parts of handle-improving agents, (IV) from 0 to about 20 parts (based on I)), preferably from 0 to about 12 parts and, more preferably, from about 0.5 to 10 parts of silicones and (V) from 0 to about 25 parts (based on I)), preferably from 0 to about 20 parts and, more preferably, from 0 to about 15 parts of other additives known per se, such as pigments, fillers, dyes, stabilizers.

The present invention also relates to the use of the PUR-composition according to the invention for the production of light coatings on the principle of heat-activated, one-coat reverse coating by applying the PUR-composition to a temporary support, drying the PUR-layer, laminating a textile substrate onto the dry PUR-layer at elevated temperature and pressure and subsequently subjecting the PUR-laminate to mixed crosslinking at elevated temperature. The process is preferably carried out continuously.

DETAILED DESCRIPTION OF THE INVENTION

The advantage of the process according to the invention for producing light coatings with spreads of, preferably, from about 15 to 50 g/m$^2$ and, more preferably, from about 15 to 30 g/m$^2$ lies in mixed crosslinking with formaldehyde resins plus blocked polyisocyanates, which enables high dry strength and wet strength values, i.e. high substrate adhesion, to be obtained. In addition, the fact that aqueous compositions are used makes the process kind to the environment and eliminates the need to recover solvents.

The high adhesion values obtained when the aqueous PUR-compositions of PUR-dispersions containing lateral OH-groups on the substantially linear polyurethane and PUR-dispersions without any lateral OH-groups are crosslinked with combinations of formaldehyde resins and blocked polyisocyanates are surprising; they had not been expected in the light of experience with the individual crosslinking agents. The unexpected effect of the two types of crosslinking agent on the adhesion of the PUR-layer to the substrates is surprising.

The polyurethane dispersions used for the polyurethane dispersion mixture (I) are polyurethane dispersions (A) which contain polyurethanes containing lateral hydroxyalkyl groups (alkyl groups containing 2 or more carbon atoms), preferably hydroxyethyl and/or 2-hydroxypropyl groups. They are preferably synthesized by the process described in DE-OS No. 27 32 131 or by modifications thereof in which (a) substantially linear prepolymers containing both terminal isocyanate groups and also terminal oxazolidine groups or (b) a mixture containing essentially linear NCO-prepolymers and bis-oxazolidines is chain-extended by mixing in water and, optionally, in the presence of other standard chain-extending agents optionally containing ionic groups, particularly diamines or ald- or ketimine derivatives thereof or hydrazine or ald- or ketazine derivatives thereof, the quantity of water being measured in such a way that at least one mole of water is present per mole of oxazolidine groups present in the reaction mixture, but preferably in such a way that dispersion-forming quantities of water are present in a large excess.

The type of and quantitative ratios between the other starting materials used in the production of the NCO-prepolymers are preferably selected in such a way that the NCO-prepolymers have (a) an average functionality of from about 1.8 to 2.2, preferably 2, and an average molecular weight of from about 500 to 10,000, preferably from about 800 to 4,000, (b) a content of cationic or anionic, incorporated groups of from 0 to about 100, preferably from about 0.1 to 100 and, more preferably, from about 0.5 to 50 milliequivalents per 100 g of solids and (c) a content of ethylene oxide units incorporated laterally, terminally and/or within the main chain and lying within a polyether segment of from 0 to about 30% by weight, preferably from about 0.5 to 30% by weight and, more preferably, from about 1 to 20% by weight, based on the total weight of the prepolymer.

Preferred NCO-prepolymers include those which contain either ionic groups, particularly $-COO^-$, $-SO_3^-$ or $=N^+=$, or non-ionic groups (polyether segments containing ethylene oxide) or both ionic and also non-ionic groups of the type in question.

The NCO-prepolymers containing from about 1.8 to 2.2 and preferably 2 terminal isocyanate groups mentioned by way of example above are preferably used in admixture with bis-oxazolidines in the process according to the invention.

In the present context, "bis-oxazolidines" are understood to be any organic compounds which contain 2 oxazolidine groups forming a hydroxyl group and a secondary amino group under the effect of water and which are otherwise inert under the conditions of the process according to the invention. Preferred bisoxazolidines include those which contain 2 groups corresponding to the following formula

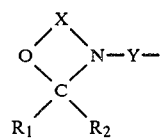

in which $R_1$ and $R_2$ may be the same or different and represent hydrogen, aliphatic $C_1$–$C_4$ hydrocarbon radicals, cycloaliphatic $C_5$–$C_7$ hydrocarbon radicals or aromatic $C_6$–$C_{10}$ hydrocarbon radicals or, together with the ring carbon atom, may form a 5-membered or 6-membered cycloaliphatic hydrocarbon ring, X represents a radical corresponding to the following formula

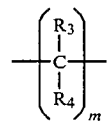

where $R_3$ and $R_4$ may be the same or different and represent $C_1$–$C_4$-alkyl radicals, but are preferably hydrogen, and m=2, Y represents a radical corresponding to the following formula

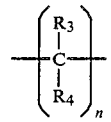

where $R_3$ and $R_4$ are as already defined and n is an integer of from 2 to 6.

Particularly preferred bis-oxazolidines are those in which 2 of the radicals corresponding to the above formulae are attached by a difunctional radical corresponding to the following formula $$-A-Z-A'-$$

in which

A and A' are the same or different and represent $-CO.O-$, $-OCO-NH-$ and

Z represents a difunctional, aliphatic $C_2$–$C_{14}$ hydrocarbon radical, a difunctional, cycloaliphatic $C_5$–$C_{14}$ hydrocarbon radical or a $C_6$–$C_{15}$ arylene radical.

Polyurethanes (A) containing lateral hydroxy alkyl groups are produced using either mixtures of the NCO-prepolymers mentioned by way of example with the bis-oxazolidines mentioned by way of example (preferred procedure) or predominantly linear prepolymers containing isocyanate groups and oxazolidine groups.

The last-mentioned prepolymers may readily be obtained by reacting the predominantly difunctional NCO-prepolymers mentioned by way of example above with oxazolidines containing hydroxyl groups and corresponding to the following formula

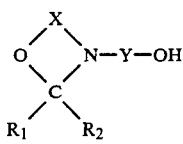

in which

R₁, R₂, X and Y are as already defined.

Where the prepolymers containing isocyanate groups and oxazolidines are produced in this way, the reactants are preferably used in such quantitative ratios that, for every mole of isocyanate groups in the NCO-prepolymer, there are from about 0.37 to 0.53 and preferably from about 0.4 to 0.51 mole of hydroxyl groups of the hydroxy oxazolidine. Reaction mixtures containing from about 0.6 to 1.1 and preferably from about 0.65 to 1.05 oxazolidine groups per remaining isocyanate group are obtained in this way. Since the monohydroxy oxazolidines are monofunctional compounds, this reaction is not accompanied by any significant enlargement of the molecule. Accordingly, in the same way as the NCO-prepolymers used as starting materials, the reaction products are substantially linear compounds.

Both the hydroxy oxazolidines and also the bis-oxazolidines mentioned are compounds known from the literature. Particularly preferred bis-oxazolidines and hydroxy oxazolidines are the corresponding compounds mentioned in U.S. Pat. No. 4,002,601 and in DE-OS No. 24 46 438.

The N-hydroxyalkyl oxazolidines are produced by methods known from the literature. To this end, a ketone or an aldehyde is condensed with a bis-(hydroxyalkyl)-amine, accompanied by cyclizing dehydration, and the water of reaction is normally removed azeotropically by an inert entraining agent or by the carbonyl compound used in excess.

Suitable carbonyl compounds

are in particular the following aldehydes and ketones: formaldehyde, acetaldehyde, propionaldehyde, butyraldehyde, isobutyraldehyde, acetone, methylethyl ketone, methyl isobutylketone, cyclohexanone and many others. Preferred carbonyl compounds are the aliphatic aldehydes mentioned, particularly isobutyraldehyde.

Suitable bis-(hydroxyalkyl)-amines

HO—X—NH—Y—OH are, in particular, bis-(2-hydroxyethyl)-amine and bis-(2-hydroxypropyl)-amine. However, equally suitable bis-(hydroxyalkyl)-amines in principle are, for example, bis-(2-hydroxybutyl)-amine, bis-(2-hydroxyhexyl)-amine, and N-(2-hydroxypropyl)-N-(6-hydroxyhexyl)-amine.

Starting out from the hydroxy oxazolidines described above, the bis-oxazolidines preferably containing urethane groups used in accordance with the invention may be obtained by reaction with diisocyanates corresponding to the following formula

OCN—Z—NCO (in which Z is as defined above), for example hexamethylene diisocyanate, 3,3,5-trimethyl-5-isocyanatomethyl cyclohexyl isocyanate (IPDI), 4,4'-diisocyanatodicyclohexyl methane, 2,4- and 2,6-diisocyanatotoluene or 4,4'-diisocyanatodiphenylmethane. Bis-oxazolidines containing ester groups suitable for use in accordance with the invention are also obtained by reaction with aliphatic, cycloaliphatic or aromatic dicarboxylic acids corresponding to the following formula

HOOC—Z—COOH.

A preferred composition for the PU-dispersions (A) containing lateral hydroxyalkyl groups are about 30 to 60% dispersions of substantially linear or slightly branched polyurethanes based on relatively high molecular weight polyols, preferably polyesters and/or polyethers having molecular weights of from about 600 to 4,000; incorporated hydrophilizing agents based on monofunctional or polyfunctional polyethers predominantly containing oxyethylene groups and/or cationic and/or anionic polyols or polyamines; and excess aliphatic (including cycloaliphatic) polyisocyanates which are converted into NCO-prepolymers, from about 0.05 to 0.6 and preferably from about 0.1 to 0.4 mole per NCO-equivalent of the NCO-prepolymers of bis-oxazolidines, optionally blocked polyisocyanates (D) in the quantities indicated, and from 0 to about 0.4 and preferably from about 0.05 to 0.3 mole per NCO-equivalent of the NCO-prepolymer of diamines and/or their ketimine derivatives and/or hydrazine (hydrate) and/or ketazine derivatives thereof, and also excess quantities of water.

The blocked polyisocyanates may be added in solvent-free form or, for example, in the form of about 30 to 80% solutions or dispersions.

Standard, known dispersions (I B) based on polyurethanes without any lateral hydroxyalkyl groups are used (preferably in smaller quantities) in addition to the polyurethane dispersions (A) containing lateral hydroxyalkyl groups.

These standard known dispersions (I B) are obtained in known manner from the usual components, namely relatively high molecular weight polyhydroxyl compounds, for example having molecular weights in the range from about 400 to 8,000; polyisocyanates, preferably aliphatic and cycloaliphatic diisocyanates; hydrophilizing substances, such as monofunctional or polyfunctional polyethers predominantly containing ethoxy groups and/or compounds containing ionic groups; and standard chain-extending agents, for example dialcohols and/or aminoalcohols and/or diamines or bisketimines thereof and/or hydrazine hydrate or ketazines thereof. Corresponding processes for their production and suitable starting components are described, for example, in DE-AS No. 10 97 678, DE-PS No. 1,184,946, DE-PS No. 1,178,586, DE-AS No. 12 37 306, DE-OS Nos. 14 95 745, 15 95 602, 17 70 068, 19 13 271, 20 19 324, 28 11 148, 24 46 440, 27 25 589, 27 32 131 and in U.S. Pat. No. 4,192,937 and in corresponding publications, for example D. Dieterich et al, Ang. Chem. 82, 53 (1970), Angew. Makromol. Chem. 76, 85 (1972) and 98, 133–165 (1981) and Progress in Organic Coatings 9, 281–340 (1981) and in the literature references cited therein.

The starting components used for producing the polyurethane dispersion are, for example, relatively high molecular weight polyols, such as difunctional and polyfunctional hydroxy polyesters, hydroxy polylactones, hydroxy polycarbonates, hydroxy polyethers and hydroxy polyacetals or their co-condensates and mixtures thereof. The molecular weights are in the range from about 400 to 8,000 and preferably in the range from about 600 to 4,000.

Suitable polyisocyanates are difunctional or polyfunctional aromatic, heterocyclic or aliphatic (including cycloaliphatic) polyisocyanates, preferably diisocyanates.

For incorporating hydrophilic centers, polyoxyethylene mono- or polyols are used either as sole centers or in admixture with ionic compounds. The ionic compounds are generally polyols containing anionic groups (for example $SO_3^-$ or carboxylate or phosphoric acid groups), for example sulfonate diols according to DE-OS No. 24 10 862 or polyamines containing sulfonate groups (for example diamines modified with ethylene, propylene or butane sulfone). Cationic groups, for example salts of tertiary amines, are also suitable hydrophilic ionic centers.

Standard, known chain-extending agents are used in addition to the ionic chain-extending agents.

The crosslinker combination II) contains (C) from about 2.5 to 90% by weight (based on II), preferably from about 3 to 60% by weight and, more preferably, from about 4 to 40% by weight of formaldehyde resins or their alkoxylated derivatives, preferably formaldehyde-urea and/or or formaldehyde-melamine resins of which the methylol groups are completely or partly etherified with alcohols, for example with methanol or butanol. The resins may be used in solvent-free form or in solution in water or alcohols. The concentration of the resin solutions preferably amounts to between about 40 and 80% by weight.

The second component of the crosslinker mixture II) contains (D) from about 10 to 97.5% by weight (based on II), preferably from about 40 to 97% by weight and, more preferably, from about 60 to 96% by weight of NCO-blocked aliphatic and/or (preferably) aromatic polyisocyanates containing at least 2 and preferably 3 or more functions. The blocked polyisocyanates may be used in solvent-free form or in the form of solutions or dispersions.

The blocked polyisocyanates may be incorporated with particular advantage during preparation of the dispersion of the polyurethanes (A) containing lateral hydroxyalkyl groups. Suitable blocking agents for the polyisocyanates are, for example, ketoximes, such as methyl ethyl ketoxime and diisobutyl ketoxime; CH-acid compounds, such as malonic ester and acetoacetic acid ester; phenols, such as phenol or nonyl phenol; or lactams, such as caprolactam.

Polyisocyanates of the type mentioned above include inter alia biuretized polyisocyanates of aliphatic diisocyanates, such as hexane diisocyanate or isophorone diisocyanate, optionally in admixture, isocyanurates of hexane-1,6-diisocyanate, isophorone diisocyanate or tolylene-2,4- and/or -2,6-diisocyanate.

The latent NCO-content of the blocked polyisocyanates and/or their solutions or dispersions amounts to between about 5 and 35% and preferably to between about 10 and 20% NCO, based on solids.

Suitable handle-improving agents (III) are longchain, saturated and unsaturated fatty acid amides or fatty acid esters, for example stearic acid amide, oleic acid amide, erucic acid amide, erucic acid N-(2-ethoxyl)-amide, erucic acid N-bis-(2-hydroxyethyl)-amide, stearic acid isobutyl ester, erucic acid hydroxy ethyl ester, ethylene glycol-bis-stearic acid ester, propylene glycol-1,3-bis-erucic acid ester, propylene-1,2-bis-stearic acid amide, also long-chain urethanes, ureas, hydrazides or semicarbazides, for example N-stearyl-0-ethyl urethane, distearyl urethane or others. It is also possible to use finely disperse polymers having particle sizes of $<10$ $\mu$m, for example polymers, polycondensates or polyadducts, such as polyethylene and polypropylene powder, powder-form polyacrylates of acrylic(methacrylic)acid alkyl esters, optionally in admixture with acrylonitrile, acrylamide, N-methylol acrylamide, N-methylene alkoxyl ether acrylamides, styrene, divinylbenzene, polyamide-6, polyamide-11, powder-form terephthalic acid polyesters, particularly polyethylene glycol terephthalate or even cellulose esters. The handle-improving agents are best incorporated by predispersion.

Silicones (IV) as additives for the compositions are, for example, toluene-soluble polydimethyl polysiloxanes which have solvent-free viscosities in the range from about 100 to 50,000 mPas/25° C. and, more particularly, in the range from about 500 to 5,000 mPas/25° C. Other silicones are organofunctional silicones, for example silicones containing terminal hydroxy alkylene groups, which are soluble in water or other polar solvents, such as ethyl alcohol or DMF. The silicones are advantageously dispersed in water. Other particularly suitable silicones are ether-group-containing silicones which contain oxyalkylene groups, preferably oxyethylene groups and/or oxypropylene groups, within the polymer chain.

Pigments, fillers, stabilizers, hydrolysis and light stabilizers and other known additives may be incorporated in the usual way in the polyurethane compositions for producing coatings by the heat-activated, one-coat reverse coating process. The aqueous polyurethane compositions may be regulated to coating viscosities of from about 3,000 to 20,000 mPas/25° C. by the addition of standard, aqueous thickeners, for example polyacrylates or high molecular weight polyoxyethylene polyethers.

The use of the aqueous polyurethane compositions according to the invention for producing light coatings by the heat-activated, one-coat reverse coating process is preferably carried out by applying (for example knife coating) the PU-composition onto a temporary support (for example siliconized release paper or optionally patterned silicone matrices), drying the layer at temperatures up to about 120° C. (for example in the range from about 60 to 100° C.), laminating the substrate on pressure rolls heated to between about 20° and 160° C. and, more particularly, to between about 80° and 125° C. and then heating the laminate at about 100° to 180° C. and preferably at about 120° to 160° C. for crosslinking.

The invention is further illustrated but is not intended to be limited by the following examples in which all parts and percentages are by weight unless otherwise specified.

EXAMPLES

Example 1

A polyurethane composition for producing a one-coat reverse coating by the heat-activated process had the following composition:

970.0 g of polyurethane dispersion (A) - 40%
15.0 g of polyethylene dispersion (III), 30% in water 9.5 g of alkoxylated polysiloxane (IV) (EO/PO-content=70:30), 30% in water, 5.0 g of melamine resin (C), 50% in water (Cassurit-HML, Hoechst AG, Frankfurt/Main, Germany)

0.5 g of catalyst solution (190 g of p-toluene sulfonic acid 101 g of N-methyl morpholine and 709 g of (water).

The approximately 40% aqueous composition was adjusted with a commercially available aqueous thickener solution (approximately 1% polyacrylic acid) to a coating viscosity of 6,000 mPas/25° C. and pigmented with 10% by weight, based on the solids content of the composition, of a commercially available pigment paste containing 50% of TiO₂.

The polyurethane dispersion (A) containing lateral OH-groups was prepared from the following components:

1224 g (0.72 mole) of a mixed polyadipate of 1,6-hexane diol/neopentyl glycol (molar ratio 65:35), 85.5 g (0.04 mole) of a monofunctional, hydrophilic n-butanol-started ether (consisting of 85% of ethylene oxide and 15% of propylene oxide units), 110.5 g (0.26 mole) of a propoxylated adduct of 2-butene-1,4-diol and sodium bisulfite, 222 g (1.0 mole) of isophorone diisocyanate (IPDI), 168 g (1.0 mole) of hexamethylene diisocyanate (HDI), 447 g of a 75% solution of a blocked isocyanurate (polyisocyanate D) obtained by trimerizing hexamethylene diisocyanate to an NCO-value of 22.8% and subsequently blocking the NCO-groups with a mixture of malonic acid diethyl ester and acetoacetic acid ethyl ester (molar ratio 3:2) (solvent mixture: xylene/ethyl glycol ether acetate 2:3):

243 g (0.50 mole) of a bis-oxazolidine urethane (I) of 2.0 moles of N-hydroxyethyl-2-isopropyl oxazolidine and 1 mole of hexamethylene diisocyanate, 7.5 g (0.15 mole) of hydrazine hydrate and 3340 g of deionized water.

The bis-oxazolidine (I) corresponds to the following formula

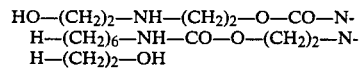

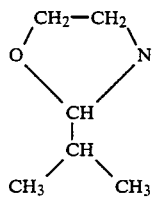

and was obtained from diethanolamine and isobutyraldehyde by reacting the hydroxyethyl oxazolidine formed

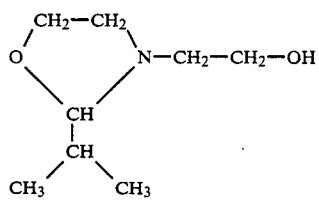

with 1,6-hexane diisocyanate to form the bis-oxazolidine (I). This splits in the presence of water (with elimination of isobutyraldehyde) to form the bis-hydroxyethyl diamine corresponding to the following formula

HO—(CH₂)₂—NH—(CH₂)₂—O—CO—NH—(CH₂)₆—NH—CO—O—(CH₂)₂—NH—(CH₂)₂—OH which was readily incorporated in the polyurethane dispersion by reaction of the aliphatic amino groups with isocyanates (for the chemistry of bis-oxazolidines, see DE-OS No. 24 46 438, U.S. Pat. No. 4,002,601 and DE-OS Nos. 19 52 091, 19 52 092, 20 18 233, 24 46 438 and 24 58 588).

The production of (A) was carried out as follows:

A mixture of IPDI and HDI was added to the mixture of polyester, polyether and bisulfite adduct freed from water in vacuo at 100° C., followed by stirring at 100° C. until the NCO-value had reached 4.4%. The prepolymer was cooled to 75° C., after which the blocked polyisocyanate and the bis-oxazolidine were successively added. After stirring for 5 minutes, the water to which the hydrazine hydrate had been added was run in with thorough stirring. The resulting dispersion was stirred for 5 hours at 70° C. and then cooled to 20° C. The dispersion had a solids content of 40%. Use of the PUR-composition in the one-coat process:

The PUR-composition was knife-coated in the form of a film onto a smooth, matt release paper (wet spread 70 g/m²). The water was evaporated at 60° to 80° C. in the first tunnel of a tandem coating machine. The PUR-film was "heat-activated" and laminated with a polyester fabric (weight per square meter 120 g/m²) under a pressure of 5 bars on a roll heated to 120° C. installed between the first and second tunnels. During its passage through the second tunnel, 120°/140°/160° C., the PUR-system was crosslinked. A light, soft coated article characterized by a pleasantly supple handle was obtained (weight of coating only 25 g/m²). The dry and wet adhesion values obtained when the "crosslinker combination" of resin and blocked isocyanate was used were considerably better than those obtained when the crosslinkers were used individually. In addition, the

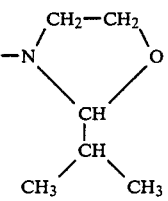

article was characterized by an excessively hard handle when the resin was used on its own for crosslinking.

The following dry and wet adhesion values (in N/2.5 cm) were obtained in comparative tests using the starting materials according to Example 1:

| Crosslinker | Dry Adhesion | Wet Adhesion | Handle |
| --- | --- | --- | --- |
| 8% by weight[1] of melamine resin C | 12–15 | 8–10 | hard (comparison) |
| (8% by weight[2] of) polyisocyanate (blocked) | 12–15 | 10–12 | soft (comparison) |
| 0.5% by weight of melamine resin 7.5% by weight[2] of polyisocyanate | 25–30 | 20–28 | soft (according to the invention) |

| Crosslinker | Dry Adhesion | Wet Adhesion | Handle |
|---|---|---|---|
| (blocked) | | | |

[1] based on the solids content of polyurethane mixture I
[2] percentage does not include the weight of the blocking agent

Example 2

An aqueous PUR-composition for producing a one-coat transfer coating by the heat-activated process had the following composition:

850 g of the approximately 40% PUR-dispersion (A) described in Example 1 (containing crosslinker (D)), 100 g of an approximately 40% PUR-dispersion (B) obtained as follows (cf. DE-OS No. 28 11 148 or U.S. Pat. No. 4,269,748):

485 g of 1,6-hexane diol polyadipate (OH number 134)

20 g trimethylol propane 82 g of propoxylated adduct of 2-butene-1,4-diol and $NaHSO_3$ (molecular weight 425)

365 g of 4,4'-dicyclohexylmethane diisocyanate 67 g of 1,6-hexane diisocyanate 50 g of acetone azine 107 g of N-methyl pyrrolidone 1500 g of deionized water The diisocyanate mixture was added to the mixture (freed from water at 120° C.) of the polyester, trimethylol propane, the propoxylated bisulfite adduct and 2 g of p-toluene sulfonic acid ester, followed by heating at 80 to 100° C. until the NCO-preadduct was formed. The acetone azine was then stirred in at approximately 50° C., N-methyl pyrrolidone was added and the water subsequently run in to form the dispersion.

The following components were also added to the composition:

10.0 g of melamine resin (C), 100% solids, soluble in water, (Maprenal MF 900; a nonplastified, methylated melamine-formaldehyde resin available from Hoechst AG; Frankfurt/Main), 1.0 g of the same catalyst solution as in Example 1, 25.0 g of a 40% aqueous dispersion (III) of an ethylene glycol-bis-fatty acid ester ($C_{15}$–$C_{18}$-mixture), 14.0 g of alkoxylated polysiloxane (IV) (EO/PO-content in the oxyalkylene chain =70:30), 100% soluble in water.

The approximately 41% aqueous PUR-composition was adjusted with a commercially available, aqueous thickener solution based on polyacrylic acid to a coating viscosity of 10,000 mPas/25° C. and pigmented with 10% of a commercially available pigment paste (50%), of Example 1 or PUR-dispersions.

Use

In the same way as in Example 1, a surface coat (dry spread 20 g/m²) was prepared and, after thermal activation at 80° C., was laminated under roll pressure with an approximately 100 g/m² spun-rayon fabric; crosslinking took place in the second tunnel at 120°-140°-160° C.

The light, soft coated article had a dry handle and showed good adhesion, being distinguished by high dry and wet adhesion, which led to high resistance to washing and dry cleaning.

Example 3

A PUR-composition for producing a one-coat transfer coating by the heat-activated process had the following composition:

840 g of the approximately 40% PUR dispersion (A) described in Example 1 (containing crosslinker D), 80 g of an approximately 30% PUR-dispersion (B), 30.0 g of a 40% dispersion of a polyethyl acrylate powder (III), crosslinked 30.0 g of a 50% dispersion of a high molecular weight polydimethyl siloxane (IV) in water 18.0 g of melamine resin (C), 100% solids, soluble in water (Maprenal MF-900; Hoechst AG; Frankfurt/Main)

2.0 g of a catalyst solution, 34% in water of 190 g of p-toluene sulfonic acid, 149 g of tri-ethanolamine and 661 g of water.

The approximately 40% aqueous PUR-composition was adjusted with a commercially available aqueous thickener solution based on polethylene oxide to a coating viscosity of 5000 mPas/25° C. and pigmented with 10% of a commercially available pigment paste (50%) oF example 1)PUR-dispersions.

Preparation of dispersion (B):

570 g of a bisphenol-A-started polypropylene glycol polyether (OH number 197)

90 g of a propoxylated adduct of 2-butene-1,4-diol and $NaHSO_3$ (OH number 261)

309 g of hexamethylene diisocyanate 75 g of urea 2380 g of deionized water 170 g of formaldehyde (30% in water)

76 g of isophorone diisocyanate

The polyether and the adduct were freed from water while stirring for 1 hour at 110° C. in a water jet vacuum and then cooled to 70° C. Hexamethylene diisocyanate was then added and the reaction mixture stirred at 80° C. until an NCO-content of 5.5% was reached. The urea was then added and the mixture heated to 125° C. and stirred. When the melt was free from NCO, it was cooled to 100° C. and the water (heated to 80° C.) stirred in. After stirring for about 1 hour, the formaldehyde was added and the mixture stirred for about another hour at 70° C. After the dispersion had been cooled to room temperature, the isophorone diisocyanate was stirred in. The dispersion was slowly heated to 90° C., while steps were taken to ensure that the evolution of carbon dioxide did not result in vigorous foaming.

The dispersion thus obtained had a solids content of 29.4%, a Ford cup viscosity of 12 seconds (4 mm orifice) and a pH-value of 6.2.

Use

In the same way as in Example 1, a surface coat was prepared (dry spread approximately 25 g/m²) and, after heat activation on a heated steel roll at 130° C., was laminated with a light blended cotton/polyester fabric (weight per unit area approximately 100 g/m²). The coated article obtained after crosslinking at 130°-150°-160° C. was light and soft and had a very dry surface with good adhesion of the PUR-layer to the substrate, resulting in high resistance to washing and dry cleaning.

Example 4

A PUR-composition for producing a one-coat transfer coating by the heat-activated process had the following composition:

- 800 g of an approximately 45% PUR-dispersion (A)
- 100 g of an approximately 40% PUR-dispersion (B)
- 50.0 g of a 40% aqueous dispersion of a PA-6,6 powder (III)
- 30.0 g of alkoxylated polyether siloxane (EO/PO-content=70:30), 100% solids, soluble in water,
- 18.0 g of melamine resin (C), 100% solids, soluble in water (Maprenal MF-900; Hoechst AG, Frankfurt/Main)
- 2.0 g of the same 34% catalyst solution as in Example 3.

The approximately 43% aqueous PUR-composition was adjusted with a commercially available aqueous thickener solution (as in Example 3) to a coating viscosity of 5000 mPas/25° C. and pigmented with 12% of a standard 40% $TiO_2$-pigment paste for PUR-dispersions.

The polyurethane dispersion (A) was prepared as follows:

- 468 g (0.52 mole) of 1,4-butane diol polyadipate,
- 400 g (0.20 mole) of 1,6-hexane diol polycarbonate,
- 85.5 g (0.04 mole) of an n-butanol-started polyether consisting of 85% of ethylene oxide and 15% of propylene oxide,
- 110.5 g (0.26 mole) of a propoxylated adduct of 2-butene-1,4-diol and sodium bisulfite,
- 267 g (1.20 mole) of isophorone diisocyanate,
- 134 g (0.80 mole) of hexamethylene diisocyanate,
- 400 g of the 75% solution of a blocked polyisocyanate (D) described in Example 1,
- 194 g (0.40 mole) of the bis-oxazolidine urethane described in Example 1,
- 12.5 g (0.25 mole) of hydrazine hydrate and
- 2300 g of deionized water.

The approximately 45% PUR-dispersion was prepared in the same way as in Example 1.

The PUR-dispersion (B) was prepared from:

- 200 g of ethylene glycol-phthalic acid polyester (OH number 56)
- 58 g of phthalic acid/adipic acid-ethylene glycol polyester (OH number 64)
- 43 g of hexamethylene diisocyanate
- 22 g of sodium aminoethyl ethylsulfonate (50% solution)
- 70 g of deionized water
- 600 g of acetone
- 16 g of isophorone diisocyanate (IPDI).

A mixture of the polyesters was freed from water while stirring for 30 minutes at 100° C. in a water jet vacuum and subsequently cooled to 70° C. Hexamethylene diisocyanate was then added and the melt stirred at 90° C. until an NCO-content of 3.4% had been reached. The melt was diluted with acetone while cooling to 50° C. When a homogeneous solution was obtained, the NCO-prepolymer was extended with the aminosulfonic acid solution.

5 minutes after the amine had been added, the polyurethane was stirred with water to form a dispersion. The acetone was then distilled off until the acetone content was less than 1% by weight. The isophorone diisocyanate was then added at room temperature. The dispersion was slowly heated to 90° C., while steps were taken to ensure that the evolution of $CO_2$ did not result in vigorous foaming. After 4 hours, the dispersion was free from NCO. The centrifuging-stable (15 minutes at 3500 r.p.m.) dispersion (solids content 41.1%) had a Ford cup viscosity (4 mm orifice) of 18.3 seconds and a pH-value of 6.

Use

As in Example 1, a surface coat (dry spread approximately 25 g/m²) was prepared and, after thermal activation at 120° C., was laminated with a knitted fabric of polyacrylic fibers. Crosslinking at 130°-140°-160° C. The elastic article which had a full handle was characterized by its outstanding resistance to washing and dry cleaning. In another embodiment, the surface coat was dried at 80° to 100° C., laminated on the roll heated to 25° C. and crosslinked at 140°-160°-180° C.

Example 5

A PUR-composition for producing a one-coat transfer coating by the heat-activated process had the following composition:

- 830 g of a 40% PUR-dispersion (A) (containing lateral OH-groups),
- 70.0 g of a blocked polyisocyanate (D), an isocyanurate of 1,6-hexane diisocyanate (1.0 mole) and tolylene-2,4/2,6-diisocyanate (65:35 isomer mixture) (2.0 moles) blocked with a mixture of malonic acid diethyl ester/acetoacetic acid ethyl ester (2:1), 50% in butylacetate/ethyl glycol acetate/xylene, (1:1:1), NCO-content approximately 8%,
- 50.0 g of a 30% aqueous dispersion of ethylene diamine-bis-($C_{16}$-$C_{18}$)-fatty acid amide (III),
- 30.0 g of polyether siloxane (EO/PO-content 70:30), 100% solids, soluble in water,
- 16.0 g of a formaldehyde-urea resin (C) with partially methylated methylol groups, 100% solids, soluble in water
- 4.0 g of the 34% catalyst solution used in Example 3.

Preparation of the polyurethane dispersion (A):

- 720 g (0.72 mole) of diethylene glycol-started polycaprolactone,
- 85.5 g (0.04 mole) of an n-butanol-started polyether (consisting of 85% of ethylene oxide and 15% of propylene oxide),
- 110.5 g (0.26 mole) of a propoxylated adduct of 2-butene-1,4-diol and sodium bisulfite,
- 267 g (1.20 mole) of isophorone diisocyanate,
- 134 g (0.80 mole) of hexamethylene diisocyanate,
- 194 g (0.40 mole) of the bis-oxazolidine urethane described in Example 1,
- 12.5 g (0.25 mole) of hydrazine hydrate and
- 2190 g of deionized water.

The reaction to form the approximately 40% PUR-dispersion was carried out in the same way as in Example 1.

The approximately 43% aqueous PUR-composition was thickened by addition of 1% aqueous solutions of polyacrylic acid to the coating viscosity(approximately 8000 mPas/25° C.) in the usual way, laminated with a light polyester fabric after heat activation and crosslinked in the same way as described in Example 3. The light outer-clothing article showed high resistance to washing and dry cleaning.

Example 6

A PUR-composition for producing a one-coat transfer coating by the heat-activated process had the following composition:

955 g of a 50% PUR-dispersion (A) prepared as follows:
  360 g (0.36 mole) of dihydroxy polypropylene glycol ether,
  720 g (0.36 mole) of dihyroxy polyoxytetramethylene polyether,
  85.5 g (0.04 mole) of a hydrophilic, monofunctional n-butanol-started ether (consisting of 85% of ethylene oxide and 15% of propylene oxide),
  110 g (0.26 mole) of propoxylated adduct of butene-1,4-diol and sodium bisulfite,
  222 g (1.0 mole) of isophorone diisocyanate,
  168 g (1.0 mole) of hexamethylene diisocyanate,
  500 g of a 75% solution of a blocked isocyanurate polyisocyanate (D) (as in Example 1),
  243 g (0.50 mole) of a bis-oxazolidine urethane (as in Example 1),
  25.5 g (0.15 mole) of isophorone diamine and
  2195 g of deionized water; reaction as in Example 1. The dispersion had a solids content of 50%.
30.0 g of a 30% aqueous dispersion of a polyethylene glycol terephthalate III,
9.0 g of a 50% aqueous solution of a polyether siloxane (EO/PO-content =70:30),
5.5 g of a 60% aqueous solution of the formaldehydeurea resin (C) of example (5),
0.4 g of the 34% catalyst solution of Example 3.

The approximately 50% aqueous PUR-composition was thickened in the usual way by addition of 1% aqueous solutions of polyacrylic acid to the coating viscosity (approxlmately 10 000 mPa.s) and laminated with a light (100 g/m²) polyamide fabric after heat activation in the same way as described in Example 3. The light outerclothing article may be washed and dry cleaned and is suitable for rainproof clothing.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. An aqueous, crosslinker-containing coating composition having a solids content of about 20 to 60% by weight and based on polyurethane dispersion which comprises
  (I) 100 parts of solids of at least one aqueous polyurethane dispersion containing
    (A) from about 43 to 100% by weight of a dispersed polyurethane containing lateral OH-groups and
    (B) from 0 to about 57% by weight of a dispersed polyurethane without lateral OH-groups and
  (II) from about 3 to 50 parts of solids, based on the solids of I, of a crosslinker combination of
    (C) from about 2.5 to 90% by weight of a formaldehyde resin and
    (D) from about 10 to 97.5% by weight of a blocked polyisocyanate.

2. The coating composition of claim 1 wherein said lateral OH-groups are lateral hydroxyalkyl groups.

3. The coating composition of claim 1 wherein said lateral OH-groups are hydroxyethyl and/or 2-hydroxypropyl groups which are obtained by reacting
  (1) an NCO-prepolymer with a bis-oxazolidine and/or
  (2) a predominantly linear NCO-prepolymer containing at least one isocyanate group and at least one oxazolidine group and
  (3) water.

4. The coating composition of claim 1 wherein said blocked polyisocyanate is a blocked aromatic polyisocyanate.

5. The coating composition of claim 3 wherein said blocked polyisocyanate is a blocked aromatic polyisocyanate.

6. The coating composition of claim 1 which additionally comprises
  (III) from about 0.3 to 3% by weight, based on the solids of I, of a handle-improving agent comprising a finely dispersed polymer selected from the group consisting of polyolefin, polyacrylates, polyamides, polyterephthalates and mixtures thereof.

7. The coating composition of claim 1 which additionally comprises
  (IV) from about 1 to 5% by weight, based on the solids of I, of a silicone.

8. An aqueous, crosslinker-containing coating composition having a solids content of about 20–60% by weight and based on polyurethane dispersions which comprises
  (I) 100 parts of solids of at least one aqueous polyurethane dispersion containing
    (A) from about 70 to 100% of a dispersed polyurethane containing lateral OH-groups and
    (B) from 0 to about 30% of a dispersed polyurethane without any lateral OH-groups,
  (II) from about 4–40 parts of solids, based on the solids of I, of a crosslinker combination of
    (C) from about 3–60% by weight of a formaldehyde-urea and/or formaldehydemelamine resin and
    (D) from about 40–97% of a blocked isocyanate.

9. The coating composition of claim 8 wherein said lateral OH-groups are lateral hydroxyalkyl groups.

10. The coating composition of claim 8 wherein said lateral OH-groups are hydroxyethyl and/or 2-hydroxypropyl groups which are obtained by reacting
  (1) an NCO-prepolymer with a bis-oxazolidine and/or
  (2) a predominantly linear NCO-prepolymer containing at least one isocyanate group and at least one oxazolidine group and
  (3) water.

11. The coating composition of claim 8 wherein said blocked polyisocyanate is a blocked aromatic polyisocyanate.

12. The coating composition of claim 10 wherein said blocked polyisocyanate is a blocked aromatic polyisocyanate.

13. The coating composition of claim 8 which additionally comprises
  (III) from about 0.3 to 3% by weight, based on the solids of I, of a handle-improving agent comprising a finely dispersed polymer selected from the group consisting of polyolefin, polyacrylates, polyamides, polyterephthalates and mixtures thereof.

14. The coating composition of claim 8 which additionally comprises
  (IV) from about 1 to 5% by weight, based on the solids of I, of a silicone.

15. A process for the production of a coating using the heat-activated, one-coat reverse coating process which comprises (a) applying the coating composition of claim 1 to a temporary support, (b) drying said coating composition, (c) laminating a textile substrate onto the dry coating composition at elevated temperature and pressure and (d) crosslinking said dry coating composition at elevated temperature.

16. The process of claim 15 wherein step (b) is conducted at temperature of up to about 120° C., step (c) is conducted at temperatures of about 20° to 160° C. and step (d) is conducted at temperatures of about 100° to 180° C.

* * * * *